United States Patent

[11] 3,591,705

[72] Inventors Richard Grigsby
London;
Raymond Jeffrey Slaughter, Kent, both of, England
[21] Appl. No. 777,121
[22] Filed Nov. 19, 1968
[45] Patented July 6, 1971
[73] Assignee British Insulated Callender's Cables Limited
London, England
[32] Priority Nov. 21, 1967
[33] Great Britain
[31] 52,897/67

[54] SUPERCONDUCTIVE DEVICES AND CONDUCTORS THEREFOR

10 Claims, 6 Drawing Figs.

[52] U.S. Cl. .......... 174/15 C, 174/117, 174/126, 335/216
[51] Int. Cl. .......... H01b 7/34
[50] Field of Search .......... 174/DIG. 6, 15 C, 117, 16—126, 133; 335/216; 72/700; 29/599

[56] References Cited

UNITED STATES PATENTS

| | | | |
|---|---|---|---|
| 415,262 | 11/1889 | Wetmore | 174/102 |
| 650,987 | 6/1900 | Ostergren | 174/15 |
| 3,343,035 | 9/1967 | Garwin | 174/15 X |
| 3,402,255 | 9/1968 | Parker | 174/133 B |
| 3,408,235 | 10/1968 | Berghout et al. | 174/DIG. 6 |
| 3,275,480 | 9/1966 | Betterton, Jr. et al. | 29/599 |

FOREIGN PATENTS

| | | | |
|---|---|---|---|
| 38-19,229 | 9/1963 | Japan | 174/DIG. 6 |

*Primary Examiner*—Lewis H. Myers
*Assistant Examiner*—A. T. Grimley
*Attorney*—Webb, Burden, Robinson & Webb

ABSTRACT: The critical current-carrying capacity of a superconductor strip is increased by folding at least one edge of the strip to form a fold which defines a lateral limit of the superconductor. The strip may be fractured at the fold and the edge portion discarded, or the folded-over portion may remain attached and lie in contact with the surface of the strip. In forming a superconductive cable, the fold is directed away from the return conductor.

Figure 1:
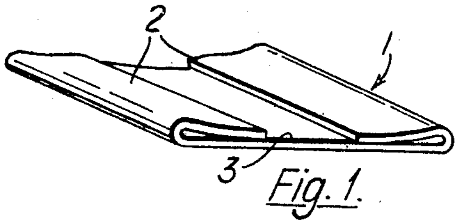

Inventor
RICHARD GRIGSBY
RAYMOND JEFFRY SLAUGHTER
By
Webb, Burden, Robinson & Webb
Attorneys Inventor
RICHARD GRIGSBY
RAYMOND JEFFREY SLAUGHTER
By
Webb Burden Robinson, Webb
Attorneys

SUPERCONDUCTIVE DEVICES AND CONDUCTORS THEREFOR

This invention relates to superconductive devices, that is devices comprising in combination a superconductor and means for reducing the temperature of the superconductor to a value below its critical temperature, to superconductors for use in such devices, and to methods of making such superconductors. The critical temperature referred to is the temperature (usually approaching absolute zero, 0° K.) at which a metal or alloy undergoes a change of state, as regards its ability to conduct electrons, which change is characterized by a disappearance of resistance to flow of a unidirectional current. When the flow of current through a superconductive material reaches a certain value, loss of superconductivity occurs. The critical value of this current depends upon the particular metallic material and its temperature. Examples of materials which become superconductive at temperatures within a few degrees of absolute zero are aluminum tin, lead, niobium and tantalum and certain alloys thereof.

The present invention is concerned only with superconductors in the form of a strip, and its object is to raise the critical current-carrying capacity of such conductors, that is to say to increase the current level at which the conductor loses its superconductive properties under given ambient conditions designed to maintain the conductor in its superconductive state, for example when immersed in liquid helium at 4.2 ° K. The invention is especially applicable to superconducting strips made of the mechanically harder of the ductile superconductive metals, such as niobium and tantalum and of those superconductive alloys of niobium and tantalum which have comparable ductility.

This object is attained, in accordance with the present invention, by folding over an edge or each edge of the strip either to the extent that the metal fractures along the fold or to the extent that the folded-over portion remains attached and lies in contact with the surface of the strip.

In use, the strip so treated is associated with a return conductor, which will normally itself take the form of a superconducting strip, in such a way that the folded edge of the strip, or, if both edges are folded, each such edge, is directed away from the return conductor. Accordingly where both edges are folded, they should be folded on the same side of the initial plane of the strip. Preferably the edges of the superconducting return conductor are similarly folded in a direction away from the first-mentioned strip. Two strips so associated may form the load-carrying conductors of a single-phase AC power cable, whereas in a polyphase cable two associated strips will be required for each phase. The term "folded edge" includes an edge fractured by folding and in this case the edge will be considered as directed in the sense in which it was folded.

Although the advantage of increased critical current-carrying capacity is obtained by folding without fracturing, working the metal at the fold until fracture occurs and complete severance of a marginal portion of the strip follows is the preferred method of practicing the invention, since it leaves a strip edge of substantially uniform thickness.

Where reverse bending is necessary to cause fracture, bending should be restricted to one side of the initial plane of the strip in order to ensure that the edges will be turned in the required direction when fracture occurs.

The invention is especially applicable to conductors for alternating current and is based on our discovery that conductor edges not treated in this way can be responsible for a "trigger action" which allows premature penetration of current. A possible chain of events is: a sudden and very local penetration of current occurring at an edge position, where the surface current density is enhanced; a resulting rapid local temperature rise over an appreciable part of the sample (in the limit, over all of it, perhaps) because temperature equalization within the sample is more rapid than heat exchange with the ambient cooling medium; and, wherever the temperature rises transiently, a fall in the critical current, which may allow current to penetrate more deeply thereby increasing losses.

The reason for the improvement obtained is not yet known but it is thought to be at least partly due to a geometrical effect resulting from turning of the sharp edge away from the field although an increase in the hardness of the edge and/or the increase in stiffness of the conductor (reducing vibration loss) may be at least partly responsible.

Before or after the edge treatment in accordance with the invention the conductor may be formed into any desired shape, for example it may be longitudinally shaped into a tubular form with its edges, one or both of which have been treated in the manner described, overlapping each other, and where the return conductor is similarly treated the two conductors are preferably concentrically arranged with the treated edge or edges of the inner conductor directed radially inwards and the treated edge or edges of the outer conductor directed radially outward.

Figure 2:
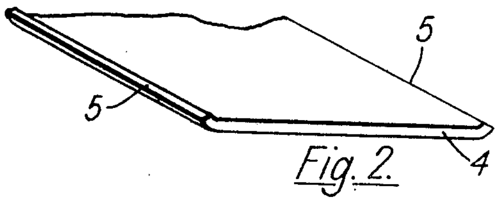
Figure 3:
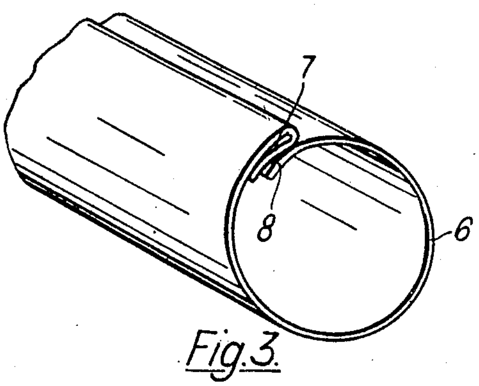
Figure 5:
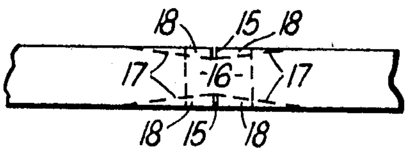
Figure 6:
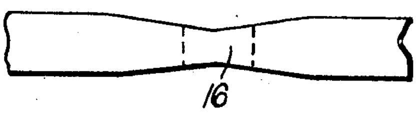
Figure 4:
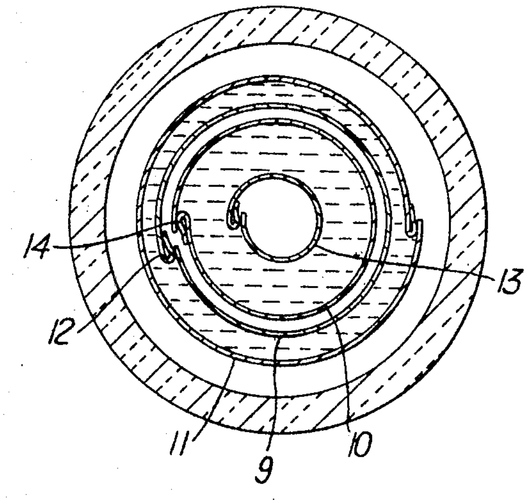

Methods of making superconductors in accordance with the invention will now be described by way of example, with reference to the accompanying drawings, wherein:

FIGS. 1—3 are perspective drawings of portions of different forms of superconducting strip made in accordance with the invention;

FIG. 4 is a diagrammatic cross section of a three-phase superconducting cable in accordance with the invention; and FIG. 5 and 6 are diagrammatic plan views showing two stages in the treatment of a short length of a superconductive strip.

As shown in FIG. 1, a superconductive strip 1 is treated by folding over its edges 2 to the extent that they lie in contact with the same face 3 of the strip.

FIG. 2 shows the preferred form of strip 4 in accordance with the invention, formed by first folding over each edge of a wider strip in a similar manner to the folding shown in FIG. 1, and then working the folded portions by reverse bending at the fold, but without at any stage bending either edge through the plane of the strip, until they fracture and become dissociated from the strip. By this method folds are in effect formed at distances from the fractured edges 5 comparable with the thickness of the strip, and the thickness of the edges is only slightly greater than the initial thickness of the strip. In one specific example, a strip of niobium 0.18 inches wide and 0.001 inches thick is treated in this manner, each fold line being spaced 0.03 inches from the edge of the strip. After dissociation of the marginal parts from the strip, the AC loss is substantially reduced, that is to say, by a factor between four and 10. For example, a cable comprising two untreated strips arranged parallel to one another and acting as forward and return superconductors has AC losses in zero externally applied magnetic field of about 4 microwatts/cm.$^2$ at 400 a. (r.m.s.) per centimeter width, whereas in a cable comprising two treated strips similarly arranged and with their folded edges directed away from one another the losses did not rise to this value until the current density reached 550 a. (r.m.s.)/cm.

FIG. 3 shows a strip 6 having one edge 7 folded over as one of the edges 2 of FIG. 1, and shaped to a tubular form with the fold directed radially inwardly and with the folded edge overlapping the opposite edge 8 of the strip. This construction is intended for use as the inner superconductor of a coaxial superconducting cable, and since the edge 8 is shielded from the magnetic field, it is unnecessary for it to be treated in accordance with the invention. Suitably the outer concentric superconductor also has an overlapped seam, but with the inner edge folded in a radially outward direction. In the case of a cable for three-phase use, an intermediate conductor may, as shown in FIG. 4, be made up of two strips 9, 10 of superconductive metal, each treated in accordance with the invention, connected in parallel. The outer strip 9 of the intermediate conductor, which is associated with the outer conductor 11 to form an outer coaxial pair has at least its outer edge 12 folded radially inwardly, whereas the inner strip 10 of the intermediate conductor, which is associated with the inner conductor 13 to form an inner coaxial pair, will have at least its inner edge 14 folded radially outwardly. Further intermediate conductors of this kind may be added if the number of phases exceeds three.

Although the edges of the strip conductor will normally be treated throughout their length, it may in some cases be found necessary only to treat an edge or the edges in a region of the strip in which softening has occurred, for example, in a region where two strips have been welded together end to end. In this case, as shown in FIGS. 5 and 6 the edges can be treated by making a short transverse cut 15 in each edge of the strip in the softened region 16 and folding the strip along lines 17 extending from the bottom of each cut in both directions along the strip to a point along the edge of the strip outside the softened region. The folds are worked until the narrow triangular-shaped pieces 18 of the strip, having as their base the transverse cuts, are completely severed from the strip to leave the strip slightly narrower than its original width in the softened region and in regions immediately adjacent to the softened region, as seen in FIG. 5.

The improvement in accordance with the invention is obtained even though the strip is initially in a hard-rolled state.

What we claim as out invention is:

1. A superconductive cable comprising two strips of superconductive metal, at least one edge of at least one of the strips having been folded in a direction away from the other strip to the extent that the metal has fractured along the fold, means for insulating the strips from one another and means for maintaining the temperature of each of the strips at a value below its critical temperature.

2. A superconductive cable as defined in claim 1 wherein each of the said strips is of a mechanically hard ductile superconductive metal.

3. A superconductive cable as defined in claim 1 wherein each of the said strips is of niobium.

4. A superconductive concentric power cable comprising inner and outer superconductors comprising respectively a first and a second strip of superconductive metal, each of which is longitudinally shaped into a tubular form with its edges overlapping each other, insulating means spacing the conductors apart from one another, and cooling means for maintaining the temperature of each conductor at a value below its critical temperature, wherein at least the radially outer edge of the first strip is defined by a fracture formed by folding over an edge of a wider strip towards that surface of the first strip that faces radially inwardly and at least the radially inner edge of the second strip is defined by a fracture formed by folding over an edge of a wider strip towards that surface of the second strip that faces radially outwardly.

5. A superconductive concentric power cable as defined in claim 4 further comprising at least one intermediate conductor comprising two strips of superconductive metal, each longitudinally shaped into a tubular form with its edges overlapping one another, the outer strip of the intermediate conductor having at least its outer edge defined by a fracture formed by folding over an edge of a wider strip towards that surface of the outer strip that faces radially inwardly and the inner strip of the intermediate conductor having at least its inner edge defined by a fracture formed by folding over an edge of a wider strip towards that surface of the inner strip that faces radially outwardly.

6. A superconductive cable comprising two strips of superconductive metal, at least one edge of one of the strips having been folded in a direction away from the other strip to the extent that it lies in contact with the surface of the first strip, means for insulating the strips from one another, and means for maintaining the temperature of each of the strips at a value below its critical temperature.

7. A superconductive cable as defined in claim 6 wherein each of the said strips is of a mechanically hard ductile superconductive metal.

8. A superconductive cable as claimed in claim 6 wherein each of the said strips is of niobium.

9. A superconductive concentric power cable comprising inner and outer superconductors comprising respectively a first and a second strip of superconductive metal, each of which is longitudinally shaped into a tubular form with its edges overlapping each other, insulating means spacing the conductors apart from one another, and cooling means for maintaining the temperature of each conductor at a value below its critical temperature, wherein at least the radially outer edge of the first strip is folded radially inwardly to the extent that it lies in contact with the radially inner surface of the first strip, and at least the radially inner edge of the second strip is folded radially outwardly to the extent that it lies in contact with the radially outer surface of the second strip.

10. A superconductive concentric power cable as claimed in claim 9 further comprising at least one intermediate conductor comprising two strips of superconductive metal, each longitudinally shaped into a tubular form with its edges overlapping one another, the outer strip of the intermediate conductor having at least its outer edge folded radially inwardly to the extent that it lies in contact with the radially inner surface of the outer strip and the inner strip of the intermediate conductor having at least its inner edge folded radially outwardly to the extent that it lies in contact with the radially outer surface of the inner strip.